March 26, 1963     T. T. BUNCH     3,082,476
FEED FOR CENTRIPETAL EXTRUDERS

Filed Feb. 27, 1961     2 Sheets-Sheet 1

INVENTOR.
T. T. BUNCH
BY Albert R. Hodges
ATTORNEY

March 26, 1963 T. T. BUNCH 3,082,476
FEED FOR CENTRIPETAL EXTRUDERS
Filed Feb. 27, 1961 2 Sheets-Sheet 2

INVENTOR.
T. T. BUNCH
BY
Albert R. Hodges
ATTORNEY

United States Patent Office

3,082,476
Patented Mar. 26, 1963

3,082,476
FEED FOR CENTRIPETAL EXTRUDERS
Tillman T. Bunch, Princeton, N.J., assignor to Western Electric Company, Incorporated, New York, N.Y., a corporation of New York
Filed Feb. 27, 1961, Ser. No. 91,794
4 Claims. (Cl. 18—12)

This invention relates generally to centripetal extruders of the sort disclosed in Plastics Engineering, October 1959, pages 107–114 and 202–210, and more particularly to new and improved feeding means for such extruders.

In the operation of centripetal extruders, one of the most troublesome problems stems from difficulty in feeding material from the feeding orifice or hopper into the extrusion channel without causing a plugging or stoppage of the feeding orifice. It is the object of this invention to provide new and improved feeding means for centripetal extruders which prevent such plugging.

A further object of the invention is to provide a novel means for causing the smooth and continuous flow of material from the feeding orifice or hopper through the extrusion channel of centripetal extruders.

A conventional centripetal extruder generally comprises two relatively moving plates in spaced, face-opposing, relation, one of which is provided with an extrusion orifice which customarily terminates in an extrusion die. These plates, usually operated as a rotor and a stator, are spaced so as to define an extrusion channel therebetween. For convenience, the extrusion channel and extrusion orifice together will be referred to herein as the "extrusion path." Material suitable for extrusion by a centripetal extruder, for example plastic material which is visco-elastic, or which may be rendered visco-elastic by the action of the extruder, is introduced near the periphery of the relatively moving plates and, in accordance with the phenomenon of centripetal pumping action, is caused to work inwardly through the extrusion channel, to build up pressure, and to be forced by this pressure through the extrusion orifice and die.

Such extruders may be fed with granular or particulate material, such as flakes, beads, powder, and the like. As used herein, the term "granular material" includes all such forms of feed material. The granular material is customarily fed into a feeding orifice or hopper formed in the extruder's casing, and falls or is drawn into the extrusion channel. At this point, heating due to friction, working of particles, and perhaps due to the addition of exogenous heat, causes the particles to soften, become tacky, and form a coherent, conglomerate mass. As this mass is worked and drawn within the extrusion channel, it gradually plasticizes, becomes plastic, and is extruded in that form.

In making this invention it has been discovered that feeding orifice plugging may be, and often is, due to the adherence of unworked granular material to partially softened, plasticizing, materials with the resulting formation of a conglomerate ball usually on the upstream side of the feeding orifice, generally in the region where the granular material first comes into contact with the conglomerate mass. For convenience, this region and the conglomerate ball so formed will be referred to herein as the "region of ball formation," and the "ball," respectively. Once partially formed, the ball tends to rotate under the influence of the relatively moving plates, to grow, break away, swing across the feeding orifice, and plug the extrusion channel. This plugging usually takes place in the vicinity of the downstream side of the feeding orifice. Newly introduced granular material and additional conglomerate material then packs against this plug, causing a stoppage. A difficult and time-consuming job of dismantling the extruder and cleaning the extrusion path usually ensues.

Having made this discovery, it has been found in accordance with this invention that such plugging may be prevented by special means for preventing the formation of the ball. As a refinement, means may be provided for causing material which would tend to form the ball to feed smoothly into the extrusion channel.

Apparatus illustrating aspects of this invention may comprise a centripetal extruder for use with granular feed material including plates which define an extrusion path, means for rotating the plates relative to one another, and means associated with the plates for preventing the formation of a ball.

Other apparatus illustrating certain aspects of this invention may comprise a centripetal extruder in which the plates are provided with a projection or plurality of projections, for example, pins, placed so as to swing through the region of ball formation. Both of the plates may be provided with one or more such projections in opposing relation.

A particularly efficacious apparatus for practicing this invention comprises a centripetal extruder in which the working faces of both plates are provided with a series of projections arranged in the form of opposing, Archimedes spirals.

A complete understanding of this invention may be obtained from the following detailed description of means forming specific embodiments thereof, when read in conjunction with the appended drawings, in which.

Figure 1:
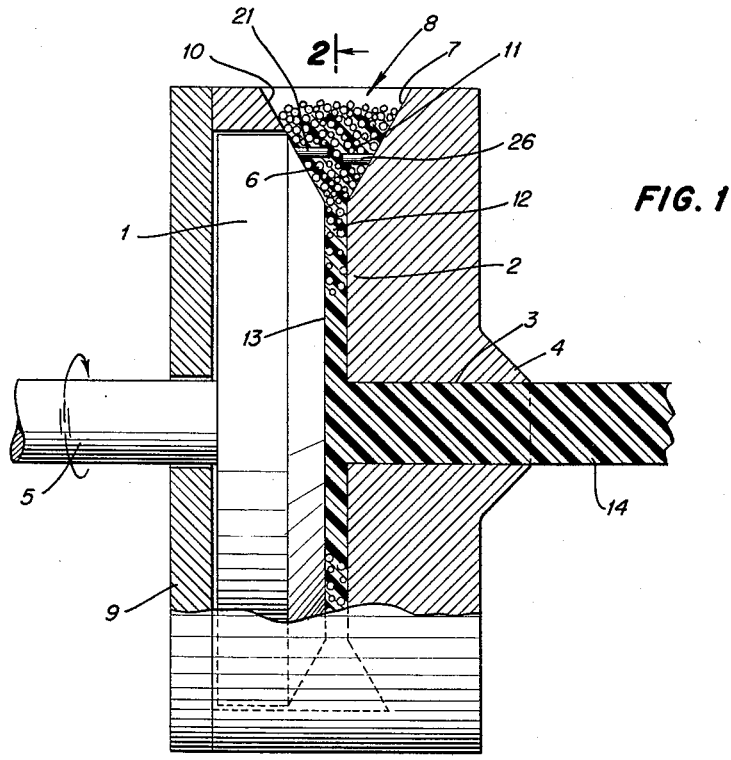
FIG. 1 is an elevation, partially in cross-section, illustrating an embodiment of this invention.

Referring to FIG. 1, a centripetal extruder suitable for illustrating this invention may comprise two plates, a rotor 1 and a stator 2, defining a narrow extrusion channel therebetween which extrusion channel terminates in an extrusion orifice 3 formed centrally in stator 2. The extrusion orifice may be provided with a suitable extrusion die 4. Although the extrusion channel shown in FIG. 1 is defined by two planar surfaces, it is to be understood that this channel may take a range of shapes, for example, the curved configuration disclosed in T. T. Bunch Patent 2,277,632.

Rotor 1 is driven by a source of rotative power (not shown) acting through a shaft 5 to rotate rotor 1 relative to stator 2. For purposes of explanation, this rotation may be assumed to be in the direction indicated by the arrow about shaft 5. Although the two plates are herein referred to as "rotor" and "stator," it is to be understood that either or both of the plates may be rotated to provide the necessary relative rotation between the plates.

Rotor 1 and stator 2 are provided respectively with bevelled portions 6 and 7 which define a portion of a feeding orifice or hopper 8. Casing 9, which may be detachably fixed to stator 2, is cut away to provide surfaces 10 which also define a portion of hopper 8.

Granular plastic material 11, which is introduced into hopper 8, tends to work into the extrusion channel between rotor 1 and stator 2. The granular material is worked by the relative movement of the rotor and stator, heated by such working (and by the addition of exogenous heat, if necessary) softens, becomes tacky, and tends to conglomerate in region 12. Further working and heating in the extrusion channel causes the adhering particles to plasticize and eventually become plastic or liquid in region 13. In accordance with known principles of centripetal extrusion, the plastic material is forced through the extrusion orifice 3 and extrusion die 4 into an extrudate 14 of desired cross-section.

Figure 2:
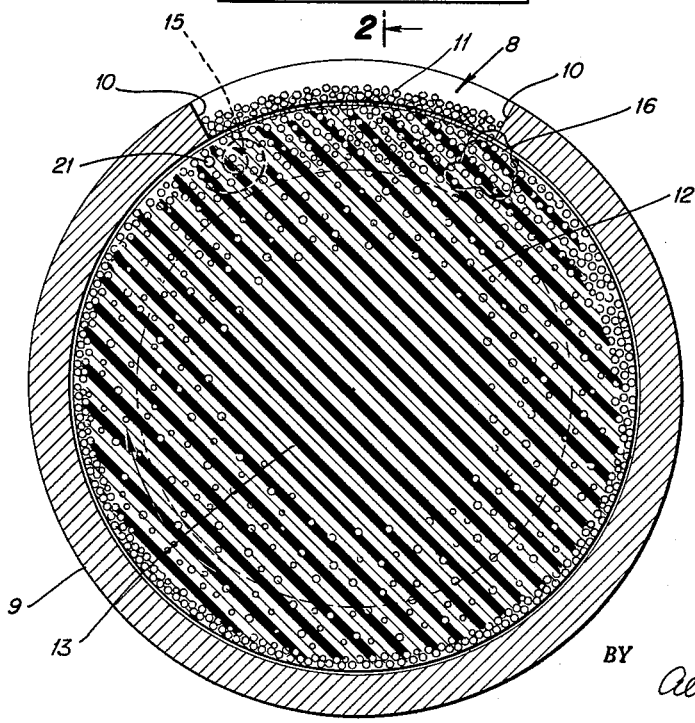
FIG. 2 is a section taken along line 2—2 of FIG. 1.

Referring to FIG. 2, it has been discovered in making this invention that granular material 11 introduced into the feeding orifice or hopper of a centripetal extruder tends to adhere to the tacky material generally in the outermost portions of conglomerate region 12. Motion of the rotor tends to turn such adhering material in a direction opposite to that of the rotation of the rotor (as indicated by the spiral arrow) and to form a ball 15 which usually tumbles at the upstream side of hopper 8 and may extend into conglomerate region 12. As ball 15 tumbles, it grows and eventualy breaks away from the vicinity of the upstream side of the hopper, swings across the feeding orifice under the influence of the rotor, and plugs the feeding orifice and extrusion channel at some downstream point. In an extruder of the type shown, such plugging will probably take place generally in region 16, that is, in the vicinity of the downstream side of the hopper. Newly introduced granular material, granules which have begun to conglomerate, and newly formed balls then pack against this plug, completely stopping the flow of material into the extruder. As mentioned above, such plugging necessitates a stopping of the operation in order to dismantle and clean the extrusion path before operations may continue.

In accordance with the invention, it has been found that a projection fixed to the rotor, for example pin 21, extending partially or substantially across the hopper in the region of ball formation will break up a ball at its early stages of formation. The pieces of balled material are then sufficiently small to be introduced into the extrusion channel without causing any plugging thereof. Although a generally cylindrical, pin-like projection is effective for breaking up a ball, projections of different shapes, for example, pins of various cross-sections, fins, and the like, will also serve this purpose. The term "pin" as used herein is intended to encompass such other shapes.

An improvement in performance is realized in an alternative embodiment of the invention in which the rotor is equipped with one projection, for example pin 21, which extends part-way across the region of ball formation, and the stator is equipped with another, opposing projection, for example pin 26 (FIGS. 1, 4), extending in the same vicinity. As shown in FIG. 1, pins 21 and 26 are of about equal length, each extending slightly less than halfway across the feeding orifice. While this is an effective arrangement, it is necessary only that pins 21 and 26 be sufficiently long to reach into the region of ball formation, that they be placed so as to avoid collision between them, and that they be placed so as to move sufficiently close to one another to coact in breaking the ball. This two-pin arrangement tends to break the forming ball into somewhat smaller pieces which are more easily and smoothly ingested by the extruder.

In making the invention, it has been discovered that the ball tends to form in the general vicinity where the granular material 11 first comes into contact with the conglomerate region 12. In accordance with another alternative embodiment of the invention, it has been found effective to provide the rotor with a plurality of projections, for example pins 21–25 (FIG. 3), which tend to sweep through the entire region of ball formation.

It is particularly effective to arrange such a plurality of pins substantially in the form of an Archimedes spiral. In this arrangement each pin is placed on a radius of the rotor 1, for example on radii $r_1$–$r_5$ (FIG. 3) respectively, each radius being angularly displaced from the next adjacent radius by an equal angle, $\theta$, and each successive radius differing in length by a constant amount, $\Delta r$. By adjusting $\Delta r$ to be substantially equal to, or less than, the diameter of the pins 21–25, the pins as a group will tend to sweep through the entire region of ball formation. In addition to effectively breaking up the forming ball, successive impacts of the pins arranged in this manner tend to drive pieces of any partially formed ball downwardly into the conglomerate region 12, thereby forcefeeding the extruder with such pieces.

Pins 21–25 may be of equal length extending partially or substantially across the region of ball formation. While pins 21–25 need only extend into the region of ball formation to be effective in breaking up the ball, somewhat longer pins will be more effective in causing the above-described force-feeding action.

Figure 4:
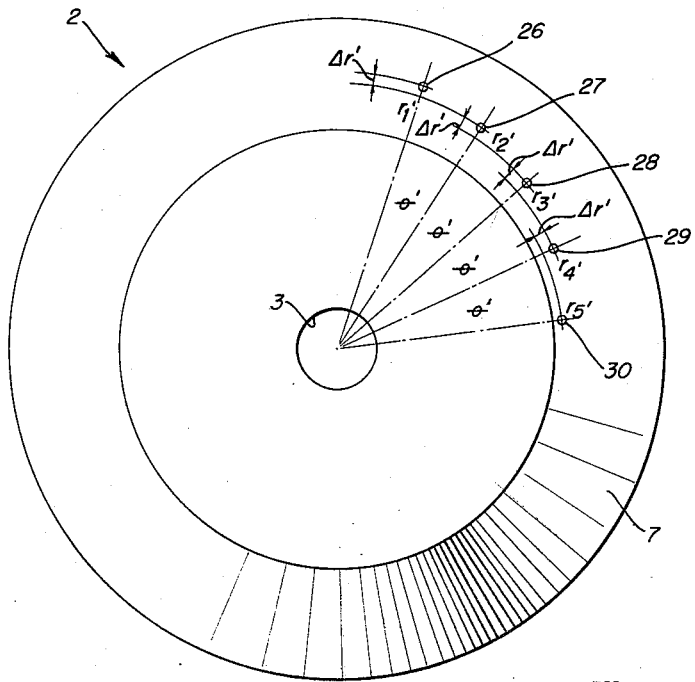
FIG. 4 is an elevation of the working face of a stator illustrating certain aspects of alternative embodiments of this invention.

As indicated above, opposing pins, one on the rotor and one on the stator, are effective in breaking up the forming ball. Extending this principle, a particularly efficacious embodiment of the invention results where a plurality of projections, for example pins 21–25 on the rotor, are opposed by a complementary plurality of projections on the stator, for example pins 26–30 (FIG. 4). Advantageously, the two arrangements may be substantially in the form of complementary Archimedes spirals arranged in the opposite sense. To accomplish such a spiral arrangement on the stator, pins 26–30 may be placed on radii $r_1'$–$r_5'$ (FIG. 4), respectively, each radius being angularly displaced from the next adjacent radius by an equal angle, $\theta'$, and each successive radius differing in length by a constant amount, $\Delta r'$.

Figure 3:
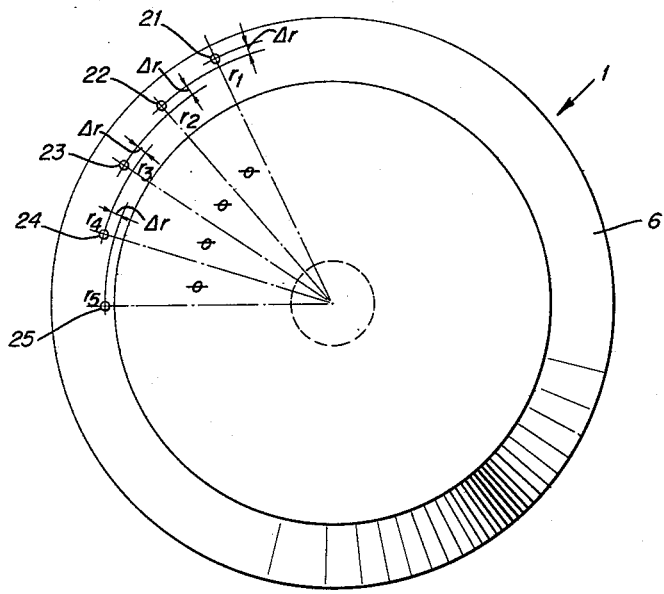
FIG. 3 is an elevation of the working face of a rotor illustrating certain aspects of alternative embodiments of this invention.

Referring to FIGS. 3 and 4, exactly complementary spiral arrangements on the rotor and stator result if radii $r_1'$–$r_5'$ are made equal to radii $r_1$–$r_5$ respectively, angles $\theta'$ equal to angles $\theta$, and lengths $\Delta r'$ equal to lengths $\Delta r$.

The lengths of the pins in the two opposing spiral groups should be sufficient to extend into the region of ball formation and, of course, must be adjusted so as to avoid collision between pins. It will be seen that this arrangement of the pins forms two opposing Archimedes spirals, one on the rotor, one on the stator, each of which extends into the region of ball formation.

The interaction of pins 21–25 with pins 26–30 placed in such an arrangement on the rotor and stator very effectively breaks up the ball into fine pieces at an early stage of its formation and drives the pieces of the ball into the extrusion channel, thereby assuring smooth and continuous feeding of material into that channel.

It is to be understood that the above-identified embodiments of this invention are simply illustrative of the application of the principles of the invention. Numerous other arrangements may be devised by those skilled in the art which will embody the principles of the invention and fall within the spirit and scope thereof.

What is claimed is:

1. A centripetal extruder for granular feed material comprising plates which define an extrusion path, means for producing relative rotation between said plates to render the material visco-elastic and for producing a force to move said material through said path, thereby forming in a portion of said path a conglomerate ball of granular feed material and partially visco-elastic material, and spirally arranged means fixed to at least one of the plates and passing through said portion of said path where the conglomerate ball is formed for breaking said conglomerate ball and augmenting said force to move said visco-elastic material through said path.

2. A centripetal extruder according to claim 1 wherein the spirally arranged means are a plurality of pins arranged in an Archimedes spiral.

3. A centripetal extruder comprising a pair of plates which define an extrusion path including an extrusion channel, means for feeding plastic granular material into said extrusion path, means for producing relative rotation between said plates to render said plastic granular material visco-elastic and for producing a force to move centripetally said material through said extrusion path and out of said extrusion channel thereby forming in a portion of said path a conglomerate ball of granular feed material and partially visco-elastic material, and spirally arranged means fixed to at least one of said plates and passing through said portion of said path for breaking said conglomerate ball and augmenting said force to move said visco-elastic material through said path, thereby preventing the plugging of said extrusion path by said conglomerate ball.

4. An apparatus for extruding a plastic material comprising a pair of spaced plates having a substantially circular cross-section perpendicular to the central axes of said plates and having the interfaces thereof circumferentially beveled, one plate being provided with an extrusion orifice at the center thereof, means for feeding granular plastic material to the beveled interfaces of said plates, means for producing relative rotation between said plates to render said plastic granular material visco-elastic and for producing a force to move centripetally said material towards and out of said extrusion orifice, thereby forming a conglomerate ball of granular feed material and partially visco-elastic material between said plates, and a plurality of noninterfering spirally arranged pins fixed to said beveled interfaces of said plates and having their longitudinal axes substantially parallel to the central axes of said plates and passing between said plates where said conglomerate ball is formed and cooperating with one another to break said conglomerate ball and augment said force to move said visco-elastic material towards and out of said extrusion orifice.

References Cited in the file of this patent

UNITED STATES PATENTS

| | | |
|---|---|---|
| 2,369,359 | MacWilliam et al. | Feb. 13, 1945 |
| 2,370,469 | Johnson | Feb. 27, 1945 |
| 2,977,632 | Bunch | Apr. 4, 1961 |

FOREIGN PATENTS

| | | |
|---|---|---|
| 1,221,112 | France | May 31, 1960 |
| 1,226,884 | France | Aug. 16, 1960 |

OTHER REFERENCES

Maxwell and Scalora article, Plastics Engineering, October 1959, pp. 107–114 and 202–210.